Figure 1:
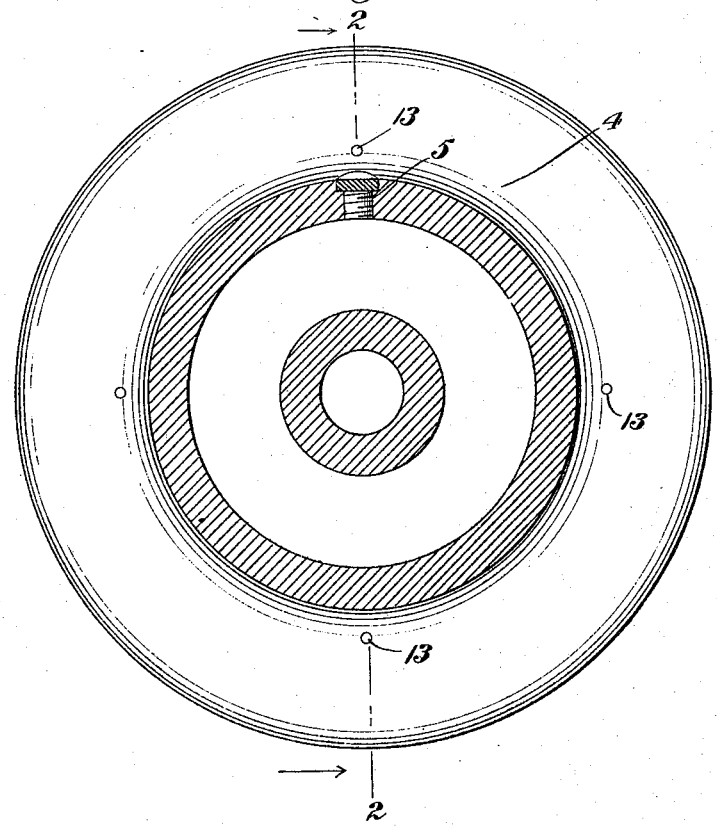

C. H. TAYLOR.
TROLLEY WHEEL.
APPLICATION FILED AUG. 2, 1916.

1,223,217.

Patented Apr. 17, 1917.

Witness
F. Windridge

Inventor
Charles H. Taylor
By Victor J. Evans
Attorney

UNITED STATES PATENT OFFICE.

CHARLES H. TAYLOR, OF SAWTELLE, CALIFORNIA.

TROLLEY-WHEEL.

1,223,217.  Specification of Letters Patent.  Patented Apr. 17, 1917.

Application filed August 2, 1916.  Serial No. 112,799.

*To all whom it may concern:*

Be it known that I, CHARLES H. TAYLOR, a citizen of the United States, residing at Sawtelle, in the county of Los Angeles and State of California, have invented new and useful Improvements in Trolley-Wheels, of which the following is a specification.

This invention has reference to trolley wheels and is designed to provide a reservoir for a fluid, such as a lubricating oil whereby the same will be automatically fed comparatively slowly to both the axle and shaft of the wheel as well as to the grooved periphery of the wheel, so that the axle will be properly lubricated and so that the contacting surface of the wheel will be likewise properly lubricated in its contact with the feed wire, the feed of the lubricant being such as to not interfere with the electric connection between the feed wire and the trolley wheel.

With the above and other objects in view the improvement resides in the construction, combination and arrangement of parts set forth in the following specification and falling within the scope of the appended claims.

Figure 2:
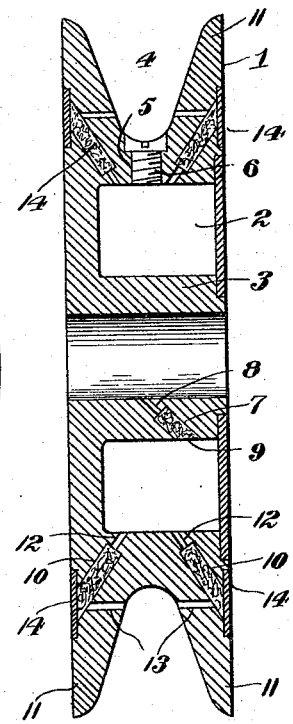

In the drawings:

Figure 1 is a central vertical sectional view through a trolley wheel constructed in accordance with the present invention, and Fig. 2 is a transverse sectional view approximately on the line 2—2 of Fig. 1.

It is well known among those skilled in the art that the jumping of the trolley wheel from the feed wire when the car is rounding a curve, is primarily incident to the fact that there is no lubrication between the trolley wheel and the wire. As almost all lubricants are a non-conductor of electricity, the idea of imparting lubricant feed for the grooved wire receiving recess of the trolley wheel has not, heretofore, as far as I am aware, been considered, and with my construction it is my purpose to feed only a slight amount of the lubricant into the grooved periphery of the wheel, not sufficient to interfere with the electrical contact between the wheel and the wire, whereby the periphery of the wheel will be perfectly lubricated, at the same time not interfering with the electrical connection between the wheel and the said wire.

In carrying out my invention I provide the trolley wheel 1 with a centrally arranged circumferential chamber 2 disposed between the hub 3 and the peripheral groove 4 of the said wheel. This chamber may be provided by grooving the wheel 1 from one of the side faces thereof and closing the groove with a suitable plate. The chamber 2 is adapted to receive a suitable lubricant which is let in through a port or opening 5 between one of the walls of the chamber and the wall provided by the groove 4, the said port being preferably threaded and closed by a stopper member 6 which preferably is in the nature of a screw, the head of the screw being received in a depression reamed in the wall of the groove 4 and, of course, communicating with the part 5. The head of the member 6 is so shaped as to not interfere with the circumferential contour of the groove 4.

The hub 3 is provided with an angularly disposed slot 7 with which centrally communicates a reduced or restricted port 8, the groove 7 receiving a packing 9 of suitable textile material, such as waste or the like, which not only filters the oil when the same passes through the port 8 but also serves as a restricting means for the flow of the oil.

The sides of the wheel are bored angularly to the oil chamber 2. The bores communicate with the outer wall of the chamber and are arranged in oppositely disposed pairs, as illustrated in Fig. 2 of the drawing. The bores are of two dimensions, the enlarged or outer portions of the same providing ports 10 and the inner or restricted portions are indicated by the numerals 12, said restricted portions or passages communicating with the chamber 2. The ports 10 are adapted to receive a filler 14 of suitable textile material, and communicating with the said ports and disposed at right angles with respect to the vertical plane of the wheel are outlet passages 13, which lead to the groove in the said wheel. The ports 10 are sealed at their upper portions in any desired manner, as for instance by plates, as illustrated in Fig. 2, and if desired the plate closing the oil chamber 2 may be employed for closing the ports upon one of the sides of the wheel. By an arrangement as above described, it will be noted that the oil will be restricted in its flow through the passages 12, ports 10, the textile filler or filtering members 14 in the said ports and through the outlet ports 13, so that only a small or determined quantity will be delivered to the groove of the wheel and from thence imparted to the wire which engages in the groove.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

1. A trolley wheel having a centrally arranged circumferential oil chamber between the hub and the grooved periphery of the wheel, said wheel being bored angularly from its outer sides to the said chamber, and each of the said bores being of two dimensions, textile filling elements in the outer and larger portions of the bores, closing means for the bores upon the outer sides of the wheel, and transversely disposed outlet passages between the said enlarged portions of the bores and the groove in the wheel.

2. A trolley wheel having a centrally arranged circumferential oil chamber between the hub and the grooved periphery of the wheel and a port having a packing of textile material between the chamber and the interior of the hub of the wheel, said wheel having angular bores communicating with the outer wall of the chamber, said bores being of two dimensions, a textile packing within the outer and larger dimension of the bore, closing means for the bore, and said wheel having a passage between the said bore and the groove in the said wheel.

In testimony whereof I affix my signature.

CHARLES H. TAYLOR.

Copies of this patent may be obtained for five cents each, by addressing the "Commissioner of Patents, Washington, D. C."